United States Patent
Chiruta et al.

(10) Patent No.: US 9,644,516 B1
(45) Date of Patent: May 9, 2017

(54) MOUNTING PLATE FOR MOUNTING INJECTORS AND DIRECTING REDUCTANT FLOW IN EXHAUST CONDUITS

(71) Applicant: Cummins Emission Solutions Inc., Columbus, IN (US)

(72) Inventors: Mihai Chiruta, Madison, WI (US); Z. Gerald Liu, Madison, WI (US); Varjavan Dastoor, Stoughton, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 35 days.

(21) Appl. No.: 14/885,573

(22) Filed: Oct. 16, 2015

(51) Int. Cl.
   F01N 3/00 (2006.01)
   F01N 3/28 (2006.01)
   F01N 3/20 (2006.01)

(52) U.S. Cl.
   CPC ......... *F01N 3/2892* (2013.01); *F01N 3/2066* (2013.01); *F01N 2610/1453* (2013.01)

(58) Field of Classification Search
   CPC ................. F01N 3/2892; F01N 3/2066; F01N 2610/1453
   USPC .......................................................... 60/274
   See application file for complete search history.

(56) References Cited

U.S. PATENT DOCUMENTS

| | | | |
|---|---|---|---|
| 6,125,629 A | 10/2000 | Patchett | |
| 6,361,754 B1 | 3/2002 | Peter-Hoblyn et al. | |
| 7,264,785 B2 | 9/2007 | Blakeman et al. | |
| 8,015,801 B2 | 9/2011 | Oberski et al. | |
| 8,109,077 B2 | 2/2012 | Reba et al. | |
| 8,240,137 B2 | 8/2012 | Liu et al. | |
| 8,381,514 B2 | 2/2013 | Salanta et al. | |
| 9,021,794 B2 | 5/2015 | Goss et al. | |
| 2009/0004083 A1 | 1/2009 | Valentine et al. | |
| 2012/0073264 A1 | 3/2012 | Li et al. | |
| 2012/0117944 A1* | 5/2012 | Zuccone | F01N 13/10 60/273 |
| 2013/0152558 A1 | 6/2013 | Loman | |
| 2013/0174537 A1 | 7/2013 | Loman et al. | |
| 2013/0219871 A1* | 8/2013 | Crandell | F01N 3/2066 60/295 |
| 2014/0260209 A1* | 9/2014 | Goss | F01N 3/2803 60/295 |

(Continued)

FOREIGN PATENT DOCUMENTS

EP 2 662 130 11/2013
WO WO-2013/154573 10/2013

*Primary Examiner* — Jason Shanske
(74) *Attorney, Agent, or Firm* — Foley & Lardner LLP

(57) ABSTRACT

An aftertreatment system comprises a SCR system including at least one catalyst for decomposing constituents of an exhaust gas produced by an engine. An exhaust conduit is fluidly coupled to the SCR system and is structured to deliver the exhaust gas to the SCR system and defines an exhaust conduit opening on a sidewall thereof. A mounting plate is positioned within the opening and includes a plurality of fluid channels. At least one mounting plate opening is defined through the mounting plate downstream of an inlet of the plurality of fluid channels and in fluid communication therewith. The fluid channels are structured to receive and direct at least a pair of exhaust gas streams to a respective opening so that they arrive at the respective opening from different directions. The pair of exhaust gas streams combine with a reductant inserted into the opening before flowing into the exhaust conduit.

26 Claims, 8 Drawing Sheets

(56) References Cited

U.S. PATENT DOCUMENTS

| | | |
|---|---|---|
| 2015/0101313 A1 | 4/2015 | Mitchell et al. |
| 2015/0196878 A1 | 7/2015 | Nunez et al. |
| 2015/0252711 A1* | 9/2015 | Muruganantham ... F01N 3/2066 248/201 |
| 2016/0273431 A1* | 9/2016 | Meier ................... F01N 3/2066 |
| 2016/0273434 A1* | 9/2016 | Meier ................... F01N 3/2896 |

* cited by examiner

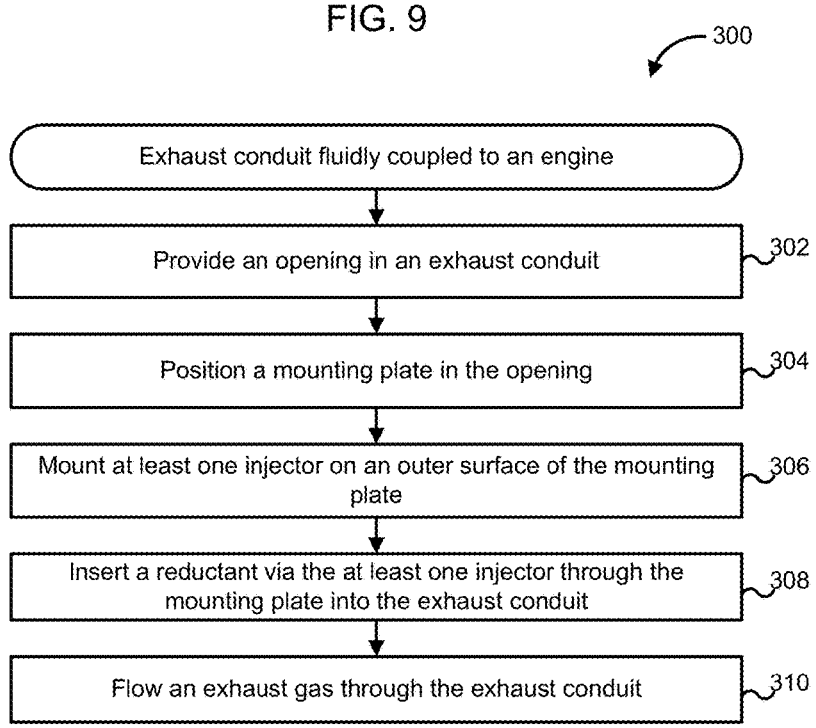

MOUNTING PLATE FOR MOUNTING INJECTORS AND DIRECTING REDUCTANT FLOW IN EXHAUST CONDUITS

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system which includes a catalyst formulated to convert NOx (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the catalyst included in the SCR system. The delivery of the reductant into conduits of the aftertreatment system is generally assisted by the exhaust gas flow to achieve efficient mixing of the reductant with the exhaust gas and reduce reductant deposits.

One or more injectors which can be included in a reductant injection assembly are used to insert the reductant into the exhaust gas stream. Large engines produce significant amounts of exhaust gas, and thereby need large volumes of reductant to be inserted into the exhaust gas stream. This is generally achieved by using multiple injectors to insert multiple reductant streams at multiple points in the exhaust gas flow. However, exhaust gas assisted delivery of reductant, which is commonly used for reductant insertion and is optimized for insertion of reductant via single injector, does not transition similarly to multi point injection of the reductant.

Simply increasing the number of insertion points can lead to poor reductant spray characteristics, poor delivery and inefficient mixing of the reductant with exhaust gas flow, for example due to cross-flow at the insertion points, and unfavorable interactions of a first reductant spray at first insertion point with a second insertion spray at a second insertion point. This can lead to increased reductant deposits within the components of the aftertreatment system, thereby increasing backpressure. The increased backpressure and poor mixing can eventually lead to reduce NOx conversion efficiency, increased maintenance costs and ultimate failure of the aftertreatment system.

SUMMARY

Embodiments described herein relate generally to systems and methods for increasing mixing of reductant with an exhaust gas flow within an exhaust conduit and reduce reductant deposits. In particular, various embodiments described herein provide for a mounting plate mounted on a sidewall of an exhaust conduit. The mounting plate is structured to mount one or more injectors and divide at least a portion of an exhaust gas entering one or more fluid channels of the mounting plate into at least a pair of exhaust gas streams directed in opposite directions. The at least a pair of exhaust gas streams combine with one or more reductant streams inserted through mounting plate openings defined in the mounting plate before being inserted into an exhaust gas flow path of the exhaust conduit.

In a first set of embodiments, an aftertreatment system comprises a SCR system including at least one catalyst for decomposing constituents of an exhaust gas produced by an engine. An exhaust conduit is fluidly coupled to the SCR system and is structured to deliver the exhaust gas to the SCR system from the engine. The exhaust conduit defines an exhaust conduit opening on a sidewall of the exhaust conduit. A mounting plate is positioned within the exhaust conduit opening. The mounting plate includes a plurality of fluid channels defined therein. The plurality of fluid channels are positioned within an exhaust gas flow path of the exhaust gas flowing through the exhaust conduit. At least one mounting plate opening is defined through the mounting plate. The mounting plate opening is in fluid communication with at least a pair of the plurality of fluid channels downstream of an inlet of each of the plurality of fluid channels. Each of the plurality of fluid channels are structured to receive and direct at least a pair of exhaust gas streams from the inlet of the plurality of fluid channels to a respective mounting plate opening so that the at least a pair of exhaust gas streams arrive at the respective outlet from different directions. The at least a pair of exhaust gas streams combine with a reductant inserted through the mounting plate opening before being inserted into the exhaust gas flow path.

In a second set of embodiments, an exhaust conduit assembly for communicating an exhaust gas from an engine to at least one aftertreatment component comprises an exhaust conduit. The exhaust conduit is structured to fluidly couple the engine to the at least one aftertreatment component. The exhaust conduit defines an exhaust conduit opening on a sidewall of the exhaust conduit. A mounting plate is positioned within the exhaust conduit opening. The mounting plate includes a plurality of fluid channels defined therein. The plurality of fluid channels are positioned within an exhaust gas flow path of the exhaust gas flowing through the exhaust conduit. At least one mounting plate opening is defined through the mounting plate. The mounting plate opening is in fluid communication with at least a pair of the plurality of fluid channels downstream of an inlet of each of the plurality of fluid channels. Each of the plurality of fluid channels are structured to receive and direct at least a pair of exhaust gas streams from an inlet to an outlet so that at least a pair of exhaust gas streams from the inlet of the plurality of fluid channels to the at least one mounting plate opening so that the at least a pair of exhaust gas streams arrive at the respective mounting plate opening from different directions. The at least a pair of exhaust gas streams combine with a reductant inserted through the at least one mounting plate opening before being inserted into the exhaust gas flow path.

In a third set of embodiments, a mounting plate for mounting a plurality of reductant insertion units comprises a plurality of mounting plate openings defined through the mounting plate. A plurality of fluid channels are defined within the mounting plate. The plurality of mounting plate openings are fluidly coupled to at least a portion of the plurality fluid channels downstream of an inlet of the at least a portion of the plurality of fluid channels. The mounting plate is positionable within an exhaust conduit opening of an exhaust conduit so that the inlet of each of the plurality of fluid channels is positioned within an exhaust gas flow path of an exhaust conduit defined by the exhaust conduit. Each of the plurality of mounting plate openings is structured to receive a reductant from at least one reductant insertion unit of the plurality of reductant insertion units. Furthermore, the plurality of fluid channels are structured to receive and direct two exhaust gas streams from the inlet of each of the plurality of fluid channels to the respective mounting plate opening so that the pair of exhaust gas streams arrive at a respective mounting plate opening from different directions. The two exhaust gas streams combine with a reductant inserted by at least one of the plurality of reductant insertion units into the respective mounting plate opening before being inserted into the exhaust gas flow path.

In a fourth set of embodiments, a method for enhancing mixing of a reductant with an exhaust gas within an exhaust conduit comprises providing an exhaust conduit opening in the exhaust conduit. A mounting plate is positioned in the exhaust conduit opening. The mounting plate includes a plurality of fluid channels defined therein. The plurality of fluid channels are positioned within an exhaust gas flow path the exhaust conduit. At least one mounting plate opening is defined through the mounting plate. The mounting plate opening is in fluid communication with at least a pair of the plurality of fluid channels downstream of an inlet of each of the plurality of fluid channels. At least one reductant insertion unit is mounted on the mounting plate. The mounting of the at least one reductant insertion unit fluidly couples the at least one reductant insertion unit to the at least one mounting plate opening. A reductant is inserted via the at least one reductant insertion unit into the mounting plate opening. An exhaust gas is flown through the exhaust conduit. The flowing causes at least a portion of the exhaust gas to enter each of the plurality of fluid channels. The portion of the exhaust gas is divided into at least a pair of exhaust gas streams flowing through each of the plurality of fluid channels. The plurality of fluid channels are structured to direct the at least a pair of exhaust gas streams from an inlet of each of the plurality of fluid channels to a respective mounting plate opening so that the at least a pair of exhaust gas streams arrive at the respective mounting plate opening from different directions. The pair of exhaust gas streams combine with the reductant before being inserted into the exhaust gas flow path.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 9 is a schematic flow diagram of an embodiment of a method of reducing droplet size and enhancing mixing of a reductant inserted into an exhaust conduit using a mounting plate.

Figure 1A:
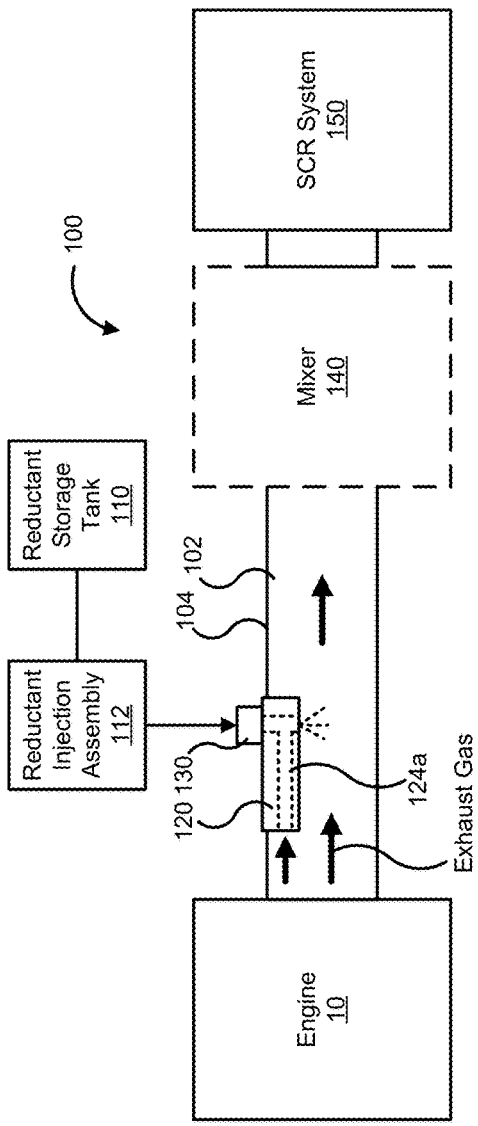
FIG. 1A is a schematic illustration of an aftertreatment system that includes an exhaust conduit with a mounting plate positioned thereon, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for increasing mixing of reductant with an exhaust gas flow within an exhaust conduit and reduce reductant deposits. In particular, various embodiments described herein provide for a mounting plate mounted on a sidewall of an exhaust conduit. The mounting plate is structured to mount one or more injectors and divide a at least a portion of an exhaust gas entering one or more fluid channels of the mounting plate into at least a pair of exhaust gas streams directed in opposite directions. The at least a pair of exhaust gas streams combine with one or more reductant streams inserted through mounting plate openings defined in the mounting plate before being inserting into an exhaust gas flow path of the exhaust conduit.

Embodiments of the exhaust conduit including the mounting plate coupled thereto may provide benefits including, for example: (1) providing a dedicated mounting plate for mounting a plurality of injectors; (2) receiving a portion of the exhaust gas stream flowing through the exhaust conduit and dividing the exhaust gas into at least two exhaust gas streams, which are combined with a reductant inserted through a mounting plate opening of the mounting plate before inserted into the exhaust conduit, thereby inhibiting impingement of the reductant onto sidewalls of the exhaust conduit and reducing reductant deposits; (3) providing a transverse flow of the reductant assisted by the exhaust gas into an exhaust gas flow path of the exhaust conduit which increase penetration of the droplets or otherwise spray of the reductant into the exhaust gas flowing through the exhaust conduit; (4) reducing interference between multiple reductant multiple sprays inserted by a plurality of injectors mounted on the mounting plate; and (5) reducing reductant droplet size and providing one or more mixers downstream of the mounting plate enhancing the mixing of the reductant with the exhaust gas.

FIG. 1 is a schematic illustration of an aftertreatment system 100 according to an embodiment. The aftertreatment system 100 is configured to receive an exhaust gas (e.g., a diesel exhaust gas) from an engine 10 (e.g., a diesel engine, a gasoline engine, a natural gas engine, a biodiesel engine, a dual-fuel engine, etc.) and decompose constituents (e.g., NOx gases) included in the exhaust gas produced by the engine 10. The aftertreatment system 100 includes an exhaust conduit 102, a mounting plate 120, an SCR system 150, and optionally a mixer 140.

The SCR system 150 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

While shown as including the SCR system 150, the aftertreatment system 100 can also include other components, for example the mixer 140 as described herein, a particulate filter, an oxidation catalyst (e.g., a diesel oxidation catalyst or an ammonia oxidation catalyst), temperature sensors, oxygen sensors, NOx sensors, ammonia sensors, and/or any other components.

The exhaust conduit 102 is fluidly coupled to the SCR system 150 and the engine 10. The exhaust conduit can include a metallic (e.g., aluminum, stainless steel, iron, alloys, etc.) pipe or tube and is structured to deliver the exhaust gas from the engine 10 to the SCR system 150. For example, the exhaust conduit 102 can be fluidly coupled to an exhaust manifold (not shown) of the engine 10 to receive the exhaust gas produced by the engine 10. FIG. 1 shows a single exhaust conduit 102 fluidly coupled to the engine 10. In other embodiments, a plurality of exhaust conduits 102 can be fluidly coupled to the engine 10. For example, the aftertreatment system 100 can have multiple banks with each bank including the exhaust conduit 102, the SCR system 150 and any other components described herein.

Figure 1B:
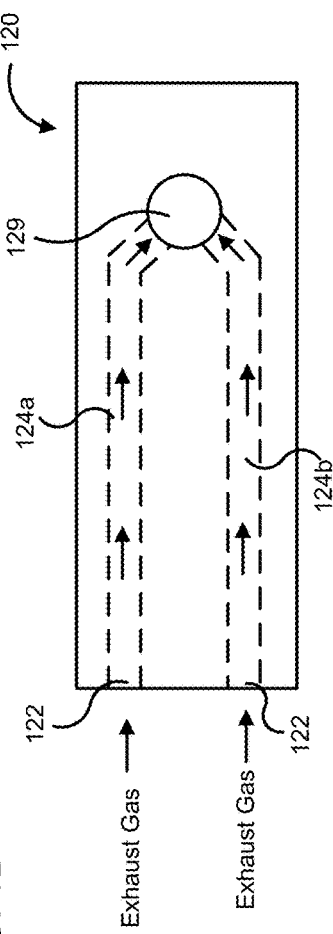
FIG. 1B is a bottom view of the mounting plate included in the aftertreatment system of FIG. 1A.

An exhaust conduit opening is defined on the sidewall 104 of the exhaust conduit 102 within which the mounting plate 120 is positioned. FIG. 1B shows a bottom view of the mounting plate 120. The mounting plate 120 can be coupled to the exhaust conduit opening defined in the exhaust conduit 102 using any suitable coupling mechanism, for example, welded (e.g., arc welded, spot welded, gas welded, heat welded, etc.), fusion bonded, joined with an adhesive or snap-fit or coupled using fasteners (e.g., screws, bolts, rivets, etc.). The coupling of the mounting plate 120 to the sidewall of the exhaust conduit 102 forms a substantially leak tight seal so that the exhaust gas cannot escape from the joint between the mounting plate 120 and the exhaust conduit opening of the exhaust conduit 102.

As used herein, the term "leak tight" is understood to encompass both a hermetic seal (i.e., a seal that is gas-impervious) as well as a seal that is liquid-impervious. The term "substantially" when used in connection with "leak tight" is intended to convey that, while total fluid imperviousness is desirable, some minimal leakage due to manufacturing tolerances, or other practical considerations (such as, for example, the pressure applied to the seal and/or within the fluid), can occur even in a "substantially fluid-tight" seal. In other embodiments, the mounting plate 120 can be monolithically formed with the exhaust conduit 102.

The mounting plate 120 includes an mounting plate opening 129, a first fluid channel 124a and a second fluid channel 124b (collectively referred to herein as "the pair of fluid channels 124"). Each of the pair of fluid channels 124 define an inlet 122 for receiving at least a portion of the exhaust gas flowing through the exhaust gas flow path of the exhaust conduit 102. The mounting plate opening 129 is positioned downstream of the inlets 122 and fluidly coupled to each of the pair of fluid channels 124.

While FIG. 1 shows the mounting plate 120 including one mounting plate opening 129 and a pair of fluid channels 124 in other embodiments, the mounting plate 120 can include a plurality of mounting plate openings 129 (e.g., 2, 3, 4 or even more). Furthermore, each opening of the plurality of mounting plate openings 129 can be fluidly connected at least a portion of the plurality of fluid channels 124. For example, each mounting plate opening 129 of the plurality of mounting plate openings 129 can be fluidly connected a plurality of fluid channels, for example two, three, four or even more fluid channels.

As shown in FIG. 1B, the pair of fluid channels 124 divide exhaust gas flowing through the inlets 122 of the pair of fluid channels 123 into two exhaust gas streams or pair of exhaust gas streams. For example, the aftertreatment system 100 can also include an injector 130 (or other reductant insertion unit) positioned on the mounting plate 120 (e.g., coupled using a fastener). The injector 130 is fluidly connected to the mounting plate opening 129 of the mounting plate 120. The injector 130 is configured to receive a reductant from a reductant storage tank 110 via a reductant insertion assembly 112 which can include, for example pumps, valves, conduits, etc. configured to deliver the reductant from the reductant storage tank 110 to the injector 130.

Any suitable reductant can be used. In some embodiments, the exhaust gas can include a diesel exhaust gas and the reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®).

The injector 130 is operable to inject or otherwise insert the reductant (e.g., a reductant stream or spray) into an exhaust gas flow path of the exhaust conduit 102 through the mounting plate opening 129 of the mounting plate 120. In various embodiments in which the mounting plate 120 includes a plurality of mounting plate openings 129, a plurality of injectors 130 can be positioned on the mounting plate 120. Each of the plurality of injectors 130 can be in fluid communication with at least one of the plurality of mounting plate openings 129 of the mounting plate 120 so that multiple streams or sprays of reductant are inserted into the exhaust conduit through the mounting plate 120 as described herein.

The pair of fluid channels 124 (or otherwise plurality of fluid channels) are structured to receive at least a portion of the exhaust gas flowing through the exhaust gas flow path and direct a pair of exhaust gas streams from the inlets 122 of the fluid channels to the mounting plate openings 129 so that the pair of exhaust gas streams arrive at the opening 129 from different directions. For example, in a particular embodiment, the pair of fluid channels 124 are structured so that the pair of exhaust gas streams arrive at the mounting plate opening 129 in opposite directions, i.e., at an angle of 180 degrees relative to each other. In other embodiments, the pair of fluid channels 124 can be structured so that the pair of exhaust gas streams arrive at the mounting plate opening 129 at any other angle relative to each other, for example 30 degrees, 45 degrees, 60 degrees, 75 degrees, 90 degrees, 105 degrees, 120 degrees, 135 degrees, 150 degrees or 165 degrees relative to each other inclusive of all ranges and values therebetween.

The pair of fluid channels 124 are positioned parallel to each other as shown in FIG. 1B. In embodiments in which the mounting plate 120 includes a plurality of fluid channels 124, each of the plurality of fluid channels 124 can be positioned parallel to each other. Inserting of the pair of exhaust gas streams in different directions, for example opposite directions, causes the pair of exhaust gas streams to arrive in opposite directions at the mounting plate opening 129 combine with the reductant inserted through the mounting plate opening 129 before being inserted into an exhaust gas flow path defined by the exhaust conduit 102. The exhaust gas flowing through the pair of fluid channels 124 combines with the reductant inserted through the mounting plate opening 129 and forces the reductant into the exhaust gas flow path, thereby enhancing mixing and preventing the reductant from impinging of the sidewalls 104 of the exhaust conduit 102. Since direct impingement of the reductant on the sidewalls 104 of the exhaust conduit 102 can increase reductant deposits, the exhaust gas assisted insertion of the reductant into the exhaust gas flow path provided by the mounting plate 120 significantly inhibits or prevents impingement and, thereby reduces reductant deposits.

The combining of the pair of exhaust gas streams approaching from opposite directions with the reductant inserted into the mounting plate opening 129 can generate a transverse flow of the exhaust reductant into the exhaust gas flow path. The transverse flow can increase penetration of the droplets or otherwise spray of the reductant into the exhaust gas flowing through the exhaust conduit 102. Inserting the reductant through the mounting plate 120 assisted by the exhaust gas flow reduces interference between multiple reductant multiple sprays inserted by a plurality of injectors 130 mounted on the mounting plate 120. The combining of the pair of exhaust gas streams with the reductant also reduces the size of the droplets forming the reductant spray inserted into the exhaust gas flow path defined by the exhaust conduit 102, thereby enhancing mixing of the reductant with the exhaust gas.

The mounting plate 120 can be formed from any suitable material, for example metals such as stainless steel, iron, etc., and formed from using any suitable process, for casting, forming, etc. In various embodiments, the mounting plate 120 can be include a first portion and a second portion which are coupled together, for example, welded together to form the mounting plate 120. The mounting plate opening 129 or a plurality of mounting plate openings 129 can be defined through the first portion and the second portion so that the mounting plate opening 129 is defined through the mounting plate 120. The pair of fluid channels 124 or a plurality of fluid channels 124 can be defined in the first portion and/or the second portion. Coupling of the first portion to the second portion fluidly couples the inlet 122 of the plurality of fluid channels to the outlet.

In some embodiments, a mixer 140 can also be positioned in the exhaust conduit 102 upstream of the SCR system 150. The mixer 140 can include a tab mixer, a swirl inducing device, any other mixer, or a combination thereof. The mixer 140 can include plates, vanes, sidewalls, vortex generators, turbulence generator passageways, bluffs or any other features configured to enhance mixing of the reductant with the exhaust gas. For example, the mixer can include a tab mixer structured to distribute the flow of the reductant over the cross-section of the exhaust conduit and/or reduce a droplet size of the reductant. The mixer 140 can also include a swirl generating device structured to increase the residence time of the reductant and the exhaust gas in the exhaust conduit, thereby enhancing the mixing of the exhaust gas with the reductant.

Figure 2:
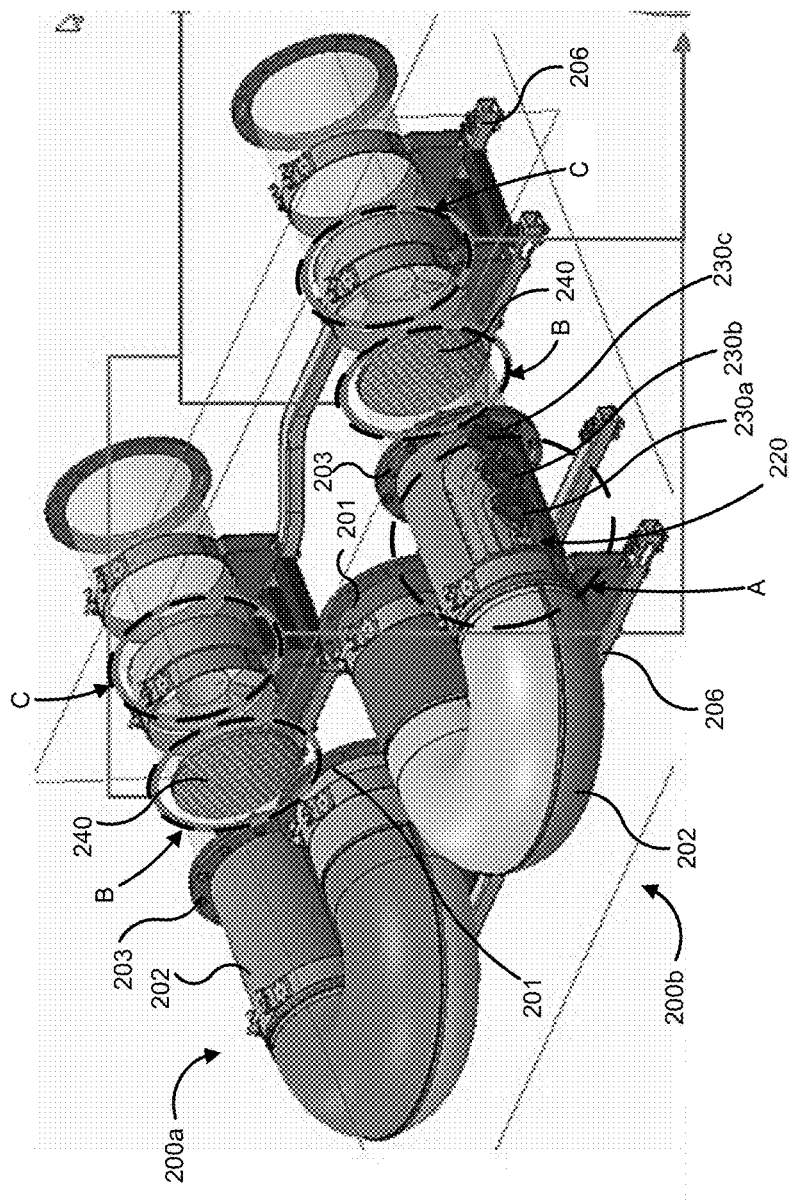
FIG. 2 is a perspective view of a portion of another embodiment of an aftertreatment system.
Figure 6:
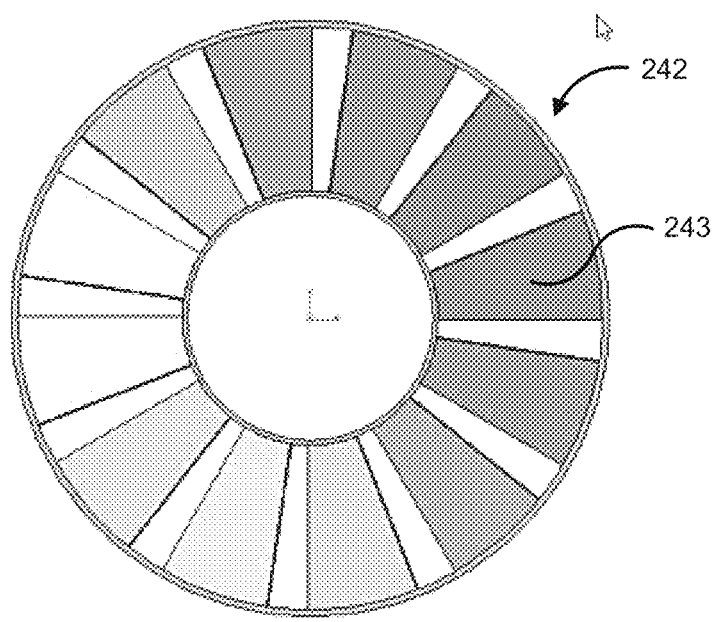
FIG. 6 is a front view of a second mixer positioned in the exhaust conduit of FIG. 2 at a position shown by the arrow C in FIG. 2.

FIG. 2 is a perspective view of a portion of another embodiment of an aftertreatment system 200. The aftertreatment system includes a first aftertreatment bank 200a and a second aftertreatment bank 200b which are substantially similar to each other. The aftertreatment system 200 is configured to receive an exhaust gas (e.g., a diesel exhaust gas) from an engine, for example the engine 10 and decompose constituents (e.g., NOx gases) included in the exhaust gas produced by the engine. Each of the first aftertreatment bank 200a and the second aftertreatment bank 200a of the aftertreatment system 200 includes an exhaust conduit 202, a mounting plate 220, a first injector 230a, a second injector 230b and a third injector 230c (collectively referred to herein as "the injectors 230"), a first mixer 240 and a second mixer 242 (see. FIG. 6). The aftertreatment system 200 can also include one more components such as, for example an SCR system (e.g., the SCR system 150) included in each of the first and second aftertreatment banks 200a and 200b of the aftertreatment system 200, or structured to receive the exhaust gas from each of the first aftertreatment bank 200a and the second aftertreatment bank 200b of the aftertreatment system 200.

The exhaust conduit 202 includes an inlet 201 structured to couple to an engine (e.g., the engine 10) to receive an exhaust gas (e.g., a diesel exhaust gas) therefrom. An outlet 203 of the exhaust conduit 202 is coupled to the first mixer 240. FIG. 2 shows the exhaust conduits 202 included in the first aftertreatment bank 200a and the second aftertreatment bank 200b as having a substantially "U-shape" so that the exhaust gas entering the exhaust conduit 202 via the inlet 201 is redirected at an angle of about 180 degrees to the outlet 203. In other embodiments, the exhaust conduits 202 can be substantially straight, curved, bent angled or have any other suitable shape. Each of the exhaust conduits 202, the first mixers 240 and the second mixer 242 are mounted on a frame 206. The frame 206 can include cross bars, rods, coupling means (e.g., apertures or throughholes to receive fasteners or welding sites) or any other securing mechanism to allow securing of the exhaust conduits 202, the first mixer 240, the second mixer 242 and/or any other component of the aftertreatment system 200 thereon.

Figure 3:
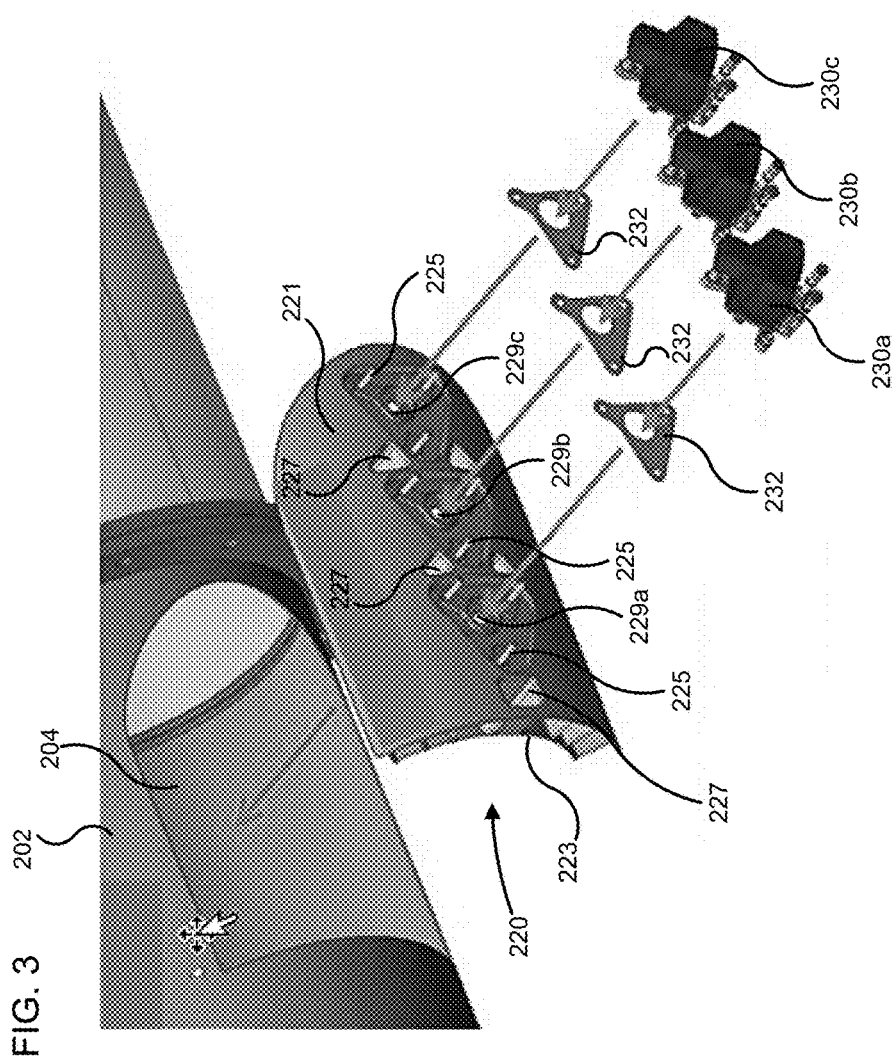
FIG. 3 is an enlarged view of a portion of the aftertreatment system of FIG. 2, with the arrow A in FIG. 2 showing a mounting plate mounted on the exhaust conduit removed from the exhaust conduit.

FIG. 3 is an enlarged view of the portion of the exhaust conduit 202 indicated by the arrow A in FIG. 3. An exhaust conduit opening 204 is defined on a sidewall of the exhaust conduit 202 within which the mounting plate 220 is positioned. The mounting plate 220 includes a first portion 221 and a second portion 223 which are coupled together (e.g., welded, screwed, fastened, fusion bonded, coupled using adhesives, etc.) to form the mounting plate 220. The mounting plate 220 can be coupled to the exhaust conduit opening 204 defined in the exhaust conduit 102 using any suitable coupling means, for example, welded (e.g., arc welded, spot welded, gas welded, heat welded, etc.), fusion bonded, joined with an adhesive or snap-fit or coupled using fasteners (e.g., screws, bolts, rivets, etc.). The coupling of the mounting plate 120 to the sidewall of the exhaust conduit 102 forms a substantially leak tight seal so that the exhaust gas cannot escape from the joint between the mounting plate 120 and the exhaust conduit opening 204, as described before herein. In various embodiments, the mounting plate 220 can be monolithically formed, for example casted.

The mounting plate 220 can be formed from any suitable material, for example metals such as stainless steel, iron, etc., and formed from using any suitable process, for example casting, forming, stamping etc. The mounting plate 220 includes a first mounting plate opening 229a, a second mounting plate opening 229b and a third mounting plate opening 229c (collectively referred to herein as "the plurality of mounting plate openings 229") defined in the first portion 221 and the second portion 223 of the mounting plate 220 so that the plurality of mounting plate openings 229 are defined through the mounting plate 220. The plurality of mounting plate openings 229 are positioned parallel to each other along a longitudinal axis of the mounting plate 220 which can be substantially parallel to an exhaust gas flow path of the exhaust gas flowing through the exhaust conduit 202. A first injector 230a, a second injector 230b and a third injector 230c (collectively referred to herein as the "plurality of injectors 230") are positioned on the first portion 221 of the mounting plate 220 and fluidly coupled to the first mounting plate opening 229a, the second mounting plate opening 229b and the third mounting plate opening 229c, respectively configured to insert reductant through the corresponding mounting plate opening 229.

Mounting features 225 are defined on the first portion 221 of the mounting plate 220 proximate to each of the plurality of mounting plate openings 229. The mounting features 225 can include, for example pins, apertures, throughholes (e.g., threaded throughholes), grooves, notches, indents, detents, slots or any other suitable mounting features for securely mounting or coupling the plurality of injectors 230 on the first portion 221 of the mounting plate 220. A gasket 232 is positioned between each injector 230 of the plurality of injectors 230 and first portion 221. Each of the gaskets 225 are positioned around each of the plurality of mounting plate openings 229 and structured to provide a leak tight seal between the each injector 230 of the plurality of injectors 230 and the corresponding mounting plate opening 229 to prevent the reductant from leaking from between the plurality of injectors 230 and the plurality of mounting plate openings 229.

Figure 4:
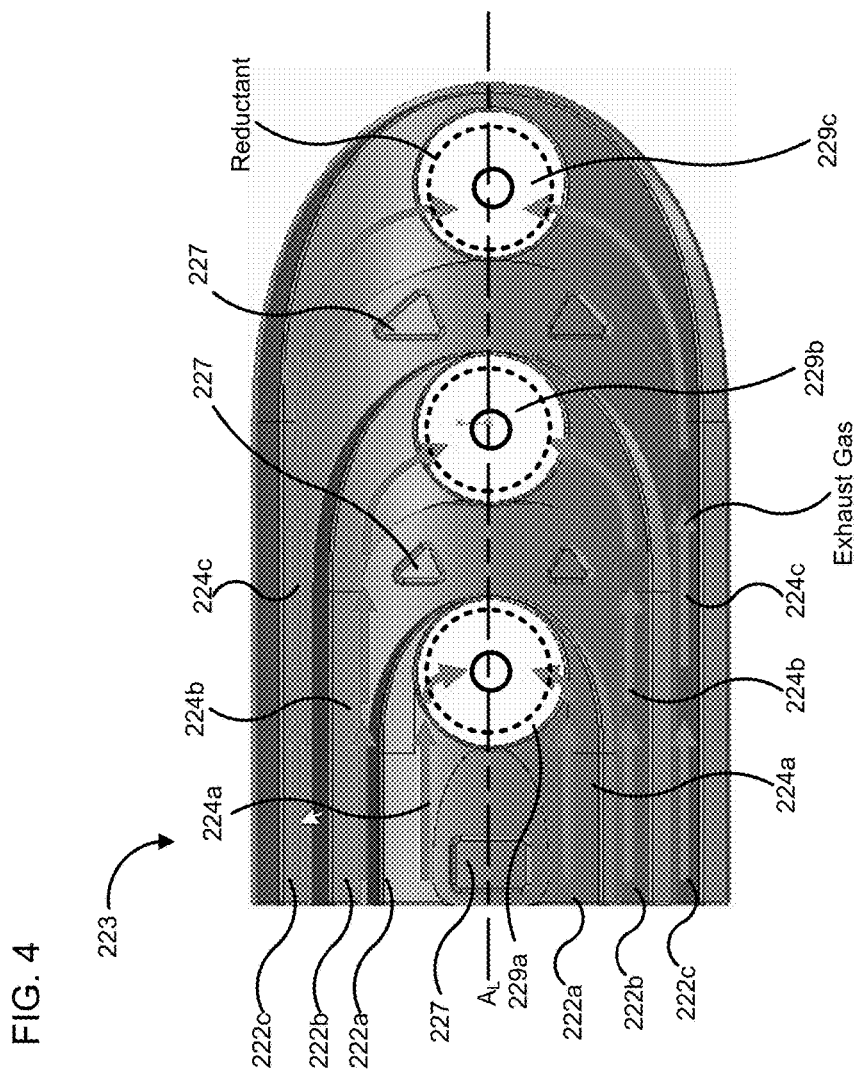
FIG. 4 is a cross-section view of the mounting plate of FIGS. 2 and 3 showing a plurality of fluid channels defined therewithin.

Each of the plurality of injectors 230 are configured to insert the reductant, for example any reductant as described with respect to FIG. 1 into the respective mounting plate opening 229 of the plurality of mounting plate opening 229 so that at least 3 streams of reductant are inserted through the mounting plate 220 into an exhaust gas flow path of the exhaust conduit 202, as described herein. FIG. 4 is a front view of the second (bottom) portion 223 of the mounting plate 220. The first mounting plate opening 229a, the second mounting plate opening 229b and the third mounting plate opening 229c are defined through the bottom portion so that the reductant inserted by the plurality of injectors 230 is inserted through the mounting plate 220. A first pair of fluid channels 224a, a second pair of fluid channels 224b and a third pair of fluid channels 224c (collectively referred to herein as the "pairs of fluid channels 224") are defined in the second portion 223 and/or the first portion 221

The first pair of fluid channels 224a includes a first inlet 222a, the second pair of fluid channels 224b include a second inlet 222b and the third pair of fluid channels 224c include a third inlet 222c (collective referred to herein as "the inlets 222.") The inlets 222 are structured to receive and direct a portion of a portion of the exhaust gas through the pairs of fluid channels 224. The pairs of fluid channels 224 are fluidly connected to a respective mounting plate opening 229 of the plurality of mounting plate openings 229 so that pairs of exhaust gas streams are directed through the pairs of fluid channels 224 towards the respective mounting plate opening 229.

As shown in FIG. 4 the plurality of mounting plate openings 229 are positioned parallel to each other and along a longitudinal axis $A_L$ of the mounting plate 220. Furthermore, the plurality of fluid channels 224 are also positioned parallel to each other. The first pair of fluid channels 224a are positioned parallel to each other and proximate to the longitudinal axis $A_L$ and on either side of the longitudinal axis $A_L$. The second pair of fluid channels 224b are positioned parallel to each other distal from the longitudinal axis $A_L$ relative to the first pair of fluid channels 224a and on either side of the first pair of fluid channels 224a. Furthermore, the third pair of fluid channels 224c are also positioned parallel to each other distal most from the longitudinal axis $A_L$ on either side of the second pair of fluid channels 224b.

The pairs of fluid channels 224 can be defined only in the second portion 223 or in each of the first portion 221 and the second portion 223 of the mounting plate 220. A plurality of alignment features 227 which include pairs of uniquely shaped grooves and protrusions are defined in each of the first portion 221 and the second portion 223 of the mounting plate 220. The plurality of alignment features 227 can be used to align the first portion 221 with the second portion 223 to facilitate a desired positioning the plurality of fluid channels 224 and the plurality of mounting plate openings 229 relative to each other once the first portion 221 is coupled to the second portion 223 to form the mounting plate 220.

As shown in FIG. 4, each pair of fluid channels 224 divide exhaust gas flowing into the mounting plate 220 into two exhaust gas streams or pair of exhaust gas streams. Each of the pair of fluid channels 224 include a curved portion leading to a respective mounting plate opening 229. The pair of fluid channels 224 are structured to direct the pair of exhaust gas streams from each of the plurality of inlets 222 to a respective mounting plate opening 229 of the plurality of mounting plate openings 229 so that the pair of exhaust gas streams arrive at the respective mounting plate opening 229 from different directions. As shown in FIG. 4, the pairs of fluid channels 224 are structured so that the pair of exhaust gas streams arrive at the respective mounting plate opening 229 in opposite directions, i.e., at an angle of 180 degrees relative to each other. In other embodiments, the pair of fluid channels 224 can be structured so that the pair of exhaust gas streams arrive at the outlet at any other angle relative to each other, for example 30 degrees, 45 degrees, 60 degrees, 75 degrees, 90 degrees, 105 degrees, 120 degrees, 135 degrees, 150 degrees or 165 degrees relative to each other.

Inserting of the pair of exhaust gas streams in different directions, for example opposite directions via the pair fluid channels 224 cause the pair of exhaust gas streams to arrive at the respective mounting plate opening 229 from the opposite directions and combine with the reductant inserted through the respective mounting plate openings 229 before being inserted into an exhaust gas flow path defined by the exhaust conduit 202. The exhaust gas assisted insertion of the reductant into the exhaust gas flow path through the mounting plate 220 via the mounting plate openings 229 greatly reduces a shearing effect of the exhaust gas flow at the mounting plate openings 229.

The combining of the pair of exhaust gas streams with the reductant before being inserted into the exhaust gas flow path can generate a transverse flow of the exhaust reductant in the exhaust gas flow path. The transverse flow can increase penetration of the droplets or otherwise spray of the reductant into the exhaust gas flowing through the exhaust conduit 202. Inserting the reductant through the mounting plate 220 reduces interference between multiple reductant streams or sprays inserted by a plurality of injectors 230 mounted on the mounting plate 220. The combining of the pair of exhaust gas streams with the reductant to insert the reductant into the exhaust gas flow path through the mounting plate openings 229 also reduces the size of the droplets forming the reductant spray inserted into the exhaust gas flow path, thereby enhancing mixing of the reductant with the exhaust gas.

Figure 5:
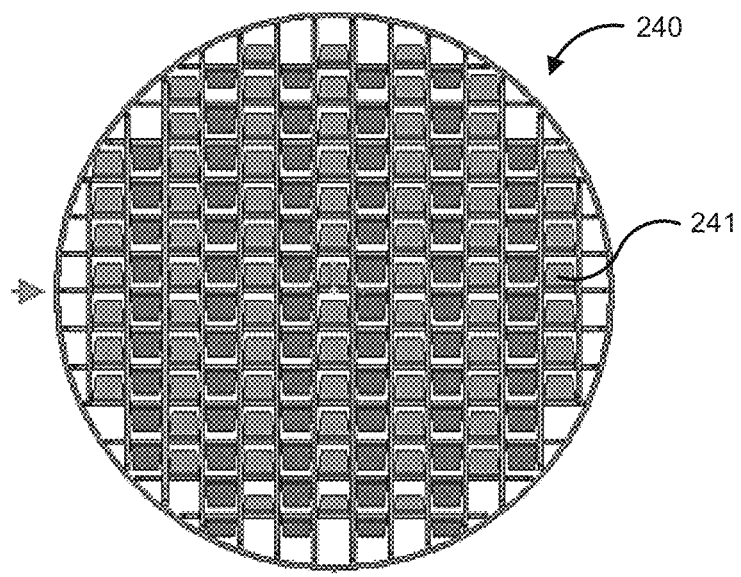
FIG. 5 is a front view of a first mixer positioned in the exhaust conduit of FIG. 2 at a position shown by the arrow B in FIG. 2.
Figure 7:
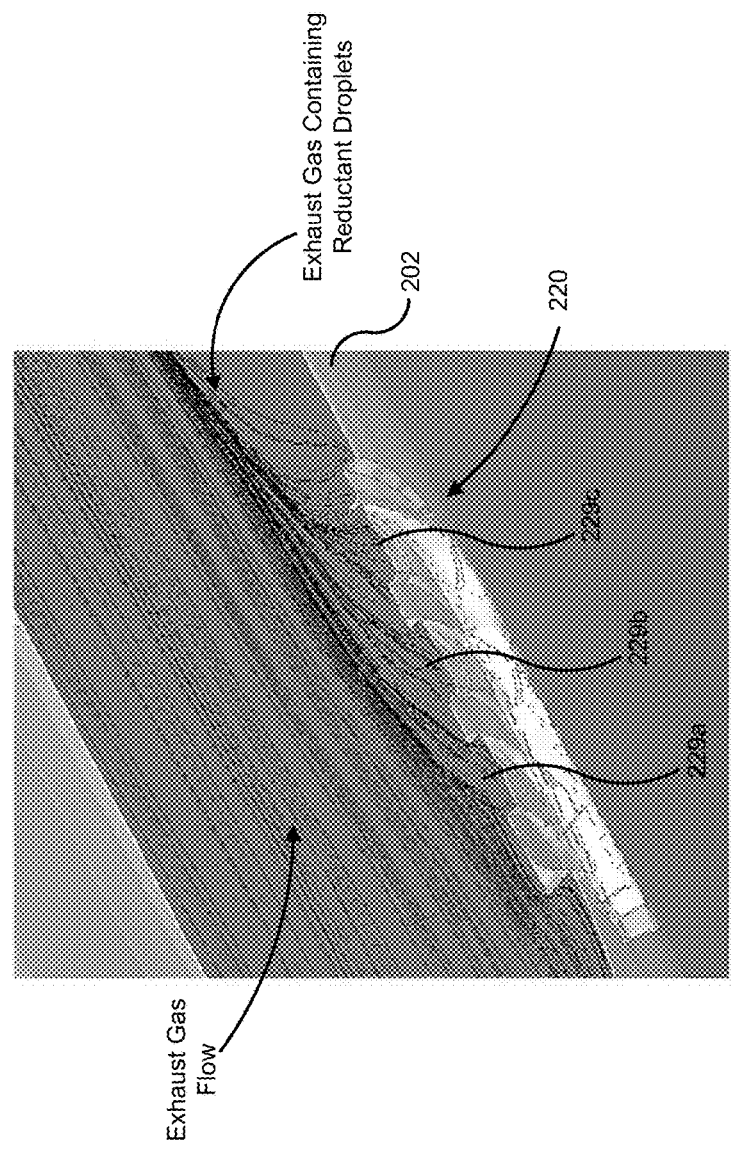
FIG. 7 is a computational fluid dynamics (CFD) model of the exhaust conduit and mounting plate of FIG. 2 and the flow path of exhaust gas streams traveling through the fluid channels and reductant inserted through the mounting plate openings of the mounting plate of FIGS. 2-3 so that the exhaust gas combines with the reductant before being inserted into an exhaust gas flow path defined by the exhaust conduit of FIG. 2.

For example, FIG. 7 shows a CFD analysis of the exhaust gas assisted insertion of multiple reductant streams inserted through the mounting plate 220 into the exhaust conduit 202. The reductant droplets mix swiftly with the exhaust gas flow and do not impinge on sidewalls of the exhaust conduit 202, thereby reducing the forming of reductant deposits on the sidewalls. A first mixer 240 is positioned in the exhaust conduit 202 downstream of the mounting plate 220. FIG. 5 shows a front view of the first mixer 240. The first mixer 240 includes a tab mixer that includes a plurality of tabs 241 structured to distribute the flow over the cross-section of the exhaust conduit 202 and/or reduce a droplet size of the reductant.

The second mixer 242 is positioned downstream of the first mixer 240 and includes a swirl generating device. The second mixer 242 includes vanes 243 or blades 243 structured to create swirls or vortex in the exhaust gas flow including the reductant mixed therein. This increases the residence time of the reductant and the exhaust gas in the exhaust conduit 202, thereby enhancing the mixing of the exhaust gas with the reductant.

Figure 8:
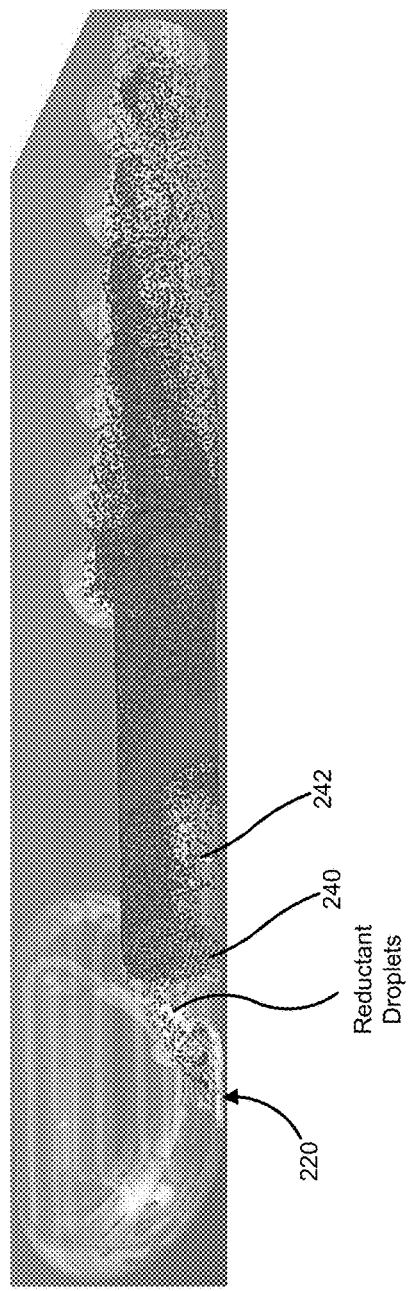
FIG. 8 is another CFD model of flow path of various streams of the exhaust gas mixed with the reductant inserted through the mounting plate of FIG. 2 in the exhaust gas flow path of the exhaust conduit of FIG. 2, and after flowing through the first and second mixer.

FIG. 8 is a CFD model of the reductant droplets inserted by the multiple reductant sprays into the exhaust flow path of the exhaust conduit. The CFD model indicates that the reductant droplets are efficiently distributed and mixed with the exhaust gas after flowing through the first mixer 240. Moreover, swirls are generated in the exhaust gas flow path after flowing through the second mixer 242. While shown as including the first mixer 240 which includes a tab mixer and the second mixer 242 which includes a swirl generating device, any other mixer or swirl generating device can be included in the aftertreatment system in addition to or instead of the first mixer 240 and the second mixer 242.

FIG. 9 is a schematic flow diagram of an example method 300 of enhancing mixing of a reductant with an exhaust gas and reducing reductant deposits of a reductant inserted into an exhaust conduit, for example the exhaust conduit 102 or 202 fluidly coupled to an engine, for example the engine 10. The method 300 includes providing an exhaust conduit opening in an exhaust conduit at 302. For example, the exhaust conduit opening 204 which can include a cutout is provided in the exhaust conduit 202.

A mounting plate is positioned in the exhaust conduit opening at 302. For example, the mounting plate 120 or 220 is positioned in the exhaust conduit opening defined in a sidewall of the exhaust conduit 102 or 202. The mounting plate (e.g., the mounting plate 120 or 220) includes a plurality of fluid channels (e.g., the fluid channels 124 or 224) defined therein. The plurality of fluid channels are positioned within an exhaust gas flow path the exhaust conduit. At least one mounting plate opening (e.g., the mounting plate opening 129 or 229) is defined through the mounting plate. The at least one mounting plate opening is in fluid communication with at least a pair of the plurality of fluid channels downstream of an inlet (e.g., the inlets 122 or 222) of each of the plurality of fluid channels, as described herein.

At least one injector is mounted on an outer surface of the mounting plate at 306. The positioning of the at least one injector fluidly couples the at least one injector to the at least one mounting plate opening. For example, the plurality of injectors 230 are positioned on the first portion 221 of the mounting plate 220 such that each of the plurality of injectors 230 are fluidly connected to a respective mounting plate opening 229 of the mounting plate 220.

A reductant is inserted via the at least one injector through the mounting plate into the exhaust conduit 308. The injector inserts the reductant into an exhaust gas flow path of the exhaust conduit through the mounting plate. For example, the plurality of injectors 230 insert the reductant insert the reductant through a respective mounting plate opening 229 of the plurality of mounting plate openings 229 into the exhaust gas flow path.

An exhaust gas is flown through the exhaust conduit at 310. The flowing of the exhaust gas causes at least a portion of the exhaust gas to enter each of the plurality of fluid channels (e.g., the plurality fluid channels 124 or 224) via an inlet of the plurality of fluid channels. The portion of the exhaust gas divides into at least a pair of exhaust gas streams flowing through each of the plurality of fluid channels. The plurality of fluid channels are structured to direct the at least a pair of exhaust gas streams from an inlet of each of the plurality of fluid channels to a respective mounting plate opening (e.g., the mounting plate openings 129 or 229) so that the at least a pair of exhaust gas streams arrive at the respective mounting plate opening from different directions. The pair of exhaust gas streams combine with the reductant at the mounting plate opening before being inserted into the exhaust gas flow path. In this manner, the reductant from each of the plurality of mounting plate openings is inserted into the exhaust gas flow path assisted by the exhaust gas flow.

In various embodiments, the pair of exhaust gas streams include two exhaust gas streams which can be directed opposite to each other. The combining of the pair of exhaust gas streams with the reductant before being inserted into the exhaust gas flow path generates a transverse flow of the reductant into the exhaust gas flow path.

The transverse flow can increase penetration of the droplets or otherwise spray of the reductant into the exhaust gas flowing through the exhaust conduit (e.g., the exhaust conduit 102 or 220). Inserting the reductant through the mounting plate reduces interference between multiple reductant sprays inserted by a plurality of injectors mounted on the mounting plate. The combining of the pair of exhaust gas streams with the reductant also reduces the size of the droplets forming the reductant spray inserted into the exhaust gas flow path defined by the exhaust conduit, thereby enhancing mixing of the reductant with the exhaust gas. Furthermore, exhaust gas assisted reductant insertion into the exhaust gas flow path also reduces impingement of the reductant onto the sidewalls of the exhaust conduit, thereby reducing reductant deposit formation on the sidewalls, as described herein.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system, comprising:
   a selective catalytic reduction system including at least one catalyst for decomposing constituents of an exhaust gas produced by an engine;
   an exhaust conduit fluidly coupled to the selective catalytic reduction system and structured to deliver the exhaust gas to the selective catalytic reduction system from the engine, the exhaust conduit defining an exhaust conduit opening on a sidewall of the exhaust conduit; and
   a mounting plate positioned within the exhaust conduit opening, the mounting plate including a plurality of fluid channels defined therein, the plurality of fluid channels positioned within an exhaust gas flow path of the exhaust gas flowing through the exhaust conduit, at least one mounting plate opening defined through the mounting plate, the at least one mounting plate opening in fluid communication with at least a pair of the plurality of fluid channels downstream of an inlet of each of the plurality of fluid channels,
   wherein each of the plurality of fluid channels are structured to receive and direct at least a pair of exhaust gas streams from the inlet of the plurality of fluid channels to the at least one mounting plate opening so that the at least a pair of exhaust gas streams arrive at the respective mounting plate opening from different directions, the at least a pair of exhaust gas streams combining with a reductant inserted through the at least one mounting plate opening before being inserted into the exhaust gas flow path.

2. The aftertreatment system of claim 1, wherein the different directions are opposite directions.

3. The aftertreatment system of claim 1, wherein the combining of the at least a pair of exhaust gas streams with the reductant generates a transverse flow of the reductant into the exhaust gas flow path.

4. The aftertreatment system of claim 1, wherein the at least one mounting plate opening includes a plurality of mounting plate openings.

5. The aftertreatment system of claim 1, wherein the at least a pair of exhaust gas streams includes two exhaust gas streams.

6. The aftertreatment system of claim 4, wherein a plurality of injectors are positioned on the mounting plate, each of the plurality of injectors fluidly coupled to a mounting plate opening of the plurality of mounting plate openings and configured to insert the reductant into the exhaust conduit through the mounting plate.

7. The aftertreatment system of claim 1, further comprising:
   at least one mixer positioned downstream of the mounting plate and upstream of the selective catalytic reduction system.

8. The aftertreatment system of claim 7, wherein the at least one mixer includes a tab mixer, the tab mixer structured to at least one of distribute the flow of the reductant over the cross-section of the exhaust conduit and reduce a droplet size of the reductant.

9. The aftertreatment system of claim 7, wherein the at least one mixer includes a swirl inducing device structured to increase the residence time of the reductant and the exhaust gas in the exhaust conduit.

10. An exhaust conduit assembly for communicating an exhaust gas from an engine to at least one aftertreatment component, comprising:
    an exhaust conduit structured to fluidly couple the engine to the at least one aftertreatment component, the exhaust conduit defining an exhaust conduit opening on a sidewall of the exhaust conduit; and
    a mounting plate positioned within the exhaust conduit opening, the mounting plate including a plurality of fluid channels defined therein, the plurality of fluid channels positioned within an exhaust gas flow path of the exhaust gas flowing through the exhaust conduit, at least one mounting plate opening defined through the mounting plate, the at least one mounting plate opening in fluid communication with at least a pair of the plurality of fluid channels downstream of an inlet of each of the at least a pair of the plurality of fluid channels,
    wherein each of the plurality of fluid channels are structured to receive and direct at least a pair of exhaust gas streams from the inlet of the plurality of fluid channels to the at least one mounting plate opening so that the at least a pair of exhaust gas streams arrive at a respective mounting plate opening from different directions, the at least a pair of exhaust gas streams combining with a reductant inserted through the respective mounting plate opening before being inserted into the exhaust gas flow path, inserting a reductant via the at least one reductant insertion unit into the at least one mounting plate opening; and flowing an exhaust gas through the exhaust conduit, wherein the flowing causes at least a portion of the exhaust gas to enter each of the plurality of fluid channels, the portion of the exhaust gas dividing into at least a pair of exhaust gas streams flowing through each of the plurality of fluid channels, the plurality of fluid channels structured to direct the at least a pair of exhaust gas streams from an inlet of each of the plurality of fluid channels to a respective mounting plate opening so that the at least a pair of exhaust gas streams arrive at the respective mounting plate opening from different directions, the at least a pair of exhaust gas streams combining with the reductant before being inserted into the exhaust gas flow path.

11. The exhaust conduit assembly of claim 10, wherein the combining of the at least a pair of exhaust gas streams with the reductant generates a transverse flow of the reductant into the exhaust gas flow path.

12. The exhaust conduit assembly of claim 10, wherein the at least one mounting plate opening includes a plurality of mounting plate openings.

13. The exhaust conduit assembly of claim 10, wherein each of the plurality of fluid channels are positioned parallel to each other.

14. The exhaust conduit assembly of claim 10, wherein each of the plurality of fluid channels have a curved portion leading to one of the at least one mounting plate opening.

15. The exhaust conduit assembly of claim 12 wherein each of the plurality of mounting plate openings are positioned along a longitudinal axis of the mounting plate.

16. The exhaust conduit assembly of claim 10, wherein the different directions are opposite directions.

17. A mounting plate for mounting a plurality of reductant insertion units, comprising:
a plurality of mounting plate openings defined through the mounting plate; and
a plurality of fluid channels defined within the mounting plate, the plurality of mounting plate openings fluidly coupled to at least a portion of the plurality of fluid channels downstream of an inlet of at least a portion of the plurality of fluid channels,
wherein the mounting plate is positionable within an exhaust conduit opening of an exhaust conduit so that the inlet of each of the plurality of fluid channels is positioned within an exhaust gas flow path of an exhaust gas defined by the exhaust conduit,
wherein each of the plurality of mounting plate openings is structured to receive a reductant from at least one reductant insertion unit of the plurality of reductant insertion units, and
wherein the plurality of fluid channels are structured to receive and direct two exhaust gas streams from the inlet of each of the plurality of fluid channels to a respective mounting plate opening so that the pair of exhaust gas streams arrive at the respective mounting plate opening from different directions, the two exhaust gas streams combining with a reductant inserted by at least one of the plurality of reductant insertion units into the respective mounting plate opening before being inserted into the exhaust gas flow path.

18. The mounting plate of claim 17, wherein each of the plurality of fluid channels are positioned parallel to each other.

19. The mounting plate of claim 17, wherein each of the plurality of fluid channels have a curved portion leading to a respective outlet.

20. The mounting plate of claim 17, wherein each of the plurality of mounting plate openings are positioned along a longitudinal axis of the mounting plate.

21. The mounting plate of claim 17, wherein the different directions are opposite directions.

22. A method for enhancing mixing of a reductant with an exhaust gas within an exhaust conduit, comprising:
providing an exhaust conduit opening in the exhaust conduit;
positioning a mounting plate in the exhaust conduit opening, the mounting plate including a plurality of fluid channels defined therein, the plurality of fluid channels positioned within an exhaust gas flow path of the exhaust conduit, at least one mounting plate opening defined through the mounting plate, the at least one mounting plate opening in fluid communication with at least a pair of the plurality of fluid channels downstream of an inlet of each of the plurality of fluid channels;
mounting at least one reductant insertion unit on the mounting plate, the mounting of the at least one reductant insertion unit fluidly coupling the at least one reductant insertion unit to the at least one mounting plate opening;
inserting a reductant via the at least one reductant insertion unit into the at least one mounting plate opening; and
flowing an exhaust gas through the exhaust conduit;
wherein the flowing causes at least a portion of the exhaust gas to enter each of the plurality of fluid channels, the portion of the exhaust gas dividing into at least a pair of exhaust gas streams flowing through each of the plurality of fluid channels, the plurality of fluid channels structured to direct the at least a pair of exhaust gas streams from an inlet of each of the plurality of fluid channels to a respective mounting plate opening so that the at least a pair of exhaust gas streams arrive at the respective mounting plate opening from different directions, the at least a pair of exhaust gas streams combining with the reductant before being inserted into the exhaust gas flow path.

23. The method of claim 22, wherein the combining of the exhaust gas streams generates a transverse flow of the reductant into the exhaust gas flow path.

24. The method of claim 22, wherein the at least one mounting plate opening includes a plurality of mounting plate openings, the plurality of mounting plate openings positioned along a longitudinal axis of the mounting plate.

25. The method of claim 22, wherein the at least a pair of exhaust gas streams include two exhaust gas streams.

26. The method of claim 22, wherein the different directions are opposite directions.

* * * * *